US012063655B2

United States Patent
Nord et al.

(10) Patent No.: US 12,063,655 B2
(45) Date of Patent: Aug. 13, 2024

(54) TELECOMMUNICATIONS APPARATUS AND METHODS

(71) Applicant: Sony Corporation, Tokyo (JP)

(72) Inventors: Lars Nord, Lund (SE); Anders Berggren, Lund (SE); Brian Alexander Martin, Basingstoke (GB); Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 700 days.

(21) Appl. No.: 16/795,580

(22) Filed: Feb. 20, 2020

(65) Prior Publication Data
US 2020/0236662 A1 Jul. 23, 2020

Related U.S. Application Data

(63) Continuation of application No. 15/126,153, filed as application No. PCT/EP2015/055163 on Mar. 12, 2015, now Pat. No. 10,575,291.

(30) Foreign Application Priority Data

Mar. 21, 2014 (EP) ..................................... 14161181

(51) Int. Cl.
*H04W 72/04* (2023.01)
*H04W 24/10* (2009.01)
(Continued)

(52) U.S. Cl.
CPC ........... *H04W 72/23* (2023.01); *H04W 24/10* (2013.01); *H04W 48/02* (2013.01); *H04W 72/54* (2023.01); *H04W 72/121* (2013.01); *H04W 92/18* (2013.01)

(58) Field of Classification Search
CPC ...... H04W 72/04; H04W 76/023; H04L 5/14; H04L 1/0031; H04L 1/1854; H04L 5/0007; H04L 5/0055
See application file for complete search history.

(56) References Cited

U.S. PATENT DOCUMENTS

2012/0093098 A1 4/2012 Charbit et al.
2012/0300662 A1 11/2012 Wang et al.
(Continued)

FOREIGN PATENT DOCUMENTS

EP 3 100 559 A1 12/2016
EP 3 515 135 A1 7/2019
(Continued)

OTHER PUBLICATIONS

Webster's New World College Dictionary 892 (4th ed. 1999).*
(Continued)

*Primary Examiner* — Christopher M Crutchfield
*Assistant Examiner* — Jean F Voltaire
(74) *Attorney, Agent, or Firm* — XSENSUS LLP

(57) ABSTRACT

Schemes for supporting device-to-device, D2D, communications between terminal devices in a wireless telecommunication system. A network entity, e.g. a base station, establishes a set pool of radio resources to be reserved for use for D2D communications and communicates an indication of these resources to terminal devices. On an ongoing basis the network entity monitors the extent to which the set of radio resources reserved for D2D communications is being used, for example based on feedback received from terminal devices or its own measurements. If it is determined the set of radio resources reserved for D2D communications is being under-utilized or over-utilized, the network entity may establish an updated set of radio resources to be used for D2D communications, and communicate this to the terminal devices. Thus a mechanism is provided for dynamically adjusting the size of a set of resources available for D2D communications in response to changing resource utilization.

2 Claims, 8 Drawing Sheets

(51) Int. Cl.
*H04W 48/02* (2009.01)
*H04W 72/23* (2023.01)
*H04W 72/54* (2023.01)
*H04W 72/121* (2023.01)
*H04W 92/18* (2009.01)

(56) References Cited

U.S. PATENT DOCUMENTS

| | | |
|---|---|---|
| 2013/0170387 A1 | 7/2013 | Wang et al. |
| 2014/0078952 A1 | 3/2014 | Bontu et al. |
| 2014/0094183 A1* | 4/2014 | Gao ............ H04W 72/51 455/450 |
| 2014/0128089 A1 | 5/2014 | Jang et al. |
| 2014/0256334 A1 | 9/2014 | Kazmi et al. |
| 2017/0034834 A1* | 2/2017 | Folke ............ H04W 76/14 |

FOREIGN PATENT DOCUMENTS

| | | |
|---|---|---|
| WO | WO 2010/049801 A1 | 5/2010 |
| WO | WO 2012/159270 A1 | 11/2012 |
| WO | WO 2012/173443 A2 | 12/2012 |
| WO | 2013/177179 A1 | 11/2013 |
| WO | 2015/112068 A1 | 7/2015 |

OTHER PUBLICATIONS

The Wordsworth Concise English Dictionary 888 (G.W. Davidson et al. eds. 1994).*
Harpercollins Compact Dictionary & THESAURUS 670 (1st ed. 2003).*
The Oxford American Desk Dictionary 536 (Frank Abate ed. 1998).*
Office Action issued in European Application 18 192 430.9-1215 dated Oct. 16, 2019.
Extended Search Report issued in European Application 18192430. 9-1215 dated Oct. 23, 2018.
International Search Report issued Jun. 2, 2015 in PCT/EP2015/ 055163 filed Mar. 12, 2015.
H. Holma et al., "LTE for UMTS OFDMA and SC-FDMA Based Radio Access", Wiley ( 20009), 4 pages.
"CSMA / CA based resource selection," Samsung, 3GPP TSG-RAN #84, R2-133840, (Nov. 11-15, 2013), 4 pages.
"Network control for Public Safety D2D Communications", Orange, Huawei, HiSilicon, Telecom Italia, 3GPP TSG-RAN WG2 Meeting #84, R2-133990, (Nov. 11-15, 2013), 5 pages.
"The Synchronizing Central Node for Out of Coverage D2D Communication", General Dynamics Broadband UK, 3GPP TSG-RAN #84, R2-134246, (Nov. 11-15, 2013), 3 pages.
"Medium Access for D2D communication", LG Electronics Inc, 3GPP TSG-RAN #84, R2-134426, (Nov. 11-15, 2013), 8 pages.
"D2D Scheduling Procedure", Ericsson, 3GPP TSG-RAN #84, Tdoc R2-134238, (Nov. 11-15, 2013), 7 pages.
"Possible mechanisms for resource selection in connectionless D2D voice communication", General Dynamics Broadband UK, 3GPP TSG-RAN #84, R2-134248, (Nov. 11-15, 2013), 9 pages.
"Simulation results for D2D voice services using connectionless approach", General Dynamics Broadband UK, 3GPP TSG-RAN #84, R2-134431, (Nov. 11-15, 2013), 6 pages.
R. Xiaogang et al, "D2D Resource Allocation under the Control of BS", DCN 16-13-0123-02-000n, University of Electronic Science and Technology of China. <https //mentor.ieee.org/802.16/dcn/13/ 16-13-0123-02-000n-d2d-resource-allocation-under-the-control-of-bs.docx>, (2013), 7 pages.
"3$^{rd}$ Generation Partnership Project; Technical Specification Group Services and System Aspects; Service accessibility" 3GPP TS 22.011, V12.0.0, Technical Specification, Release 12, (Mar. 2013), 26 pages.
"3$^{rd}$ Generation Partnership Project: Technical Specification Group Radio Access Network; Evolved Universal Terrestrial Radio Access (E-UTRA); Radio Resource Control (RRC); Protocol specification," 3GPP TS 36.331, V11.6.0, Technical Specification, Release 11, (Dec. 2013), 349 pages.
Study on LTE Device Proximity Services, Qualcomm Incorporated, 3GPP TSG RAN Meeting #58, RP-122009, (2012), 6 pages.
Work Item Proposal on LTE Device to Device Proximity Services, Qualcomm Incorporated, 3GPP TSG RAN Meeting #63, RP-140518, (Mar. 3-6, 2014), 7 pages.

* cited by examiner

TELECOMMUNICATIONS APPARATUS AND METHODS

CROSS-REFERENCE TO RELATED APPLICATIONS

The present application is a continuation of U.S. application Ser. No. 15/126,153, filed Sep. 14, 2016, which is based on PCT filing PCT/EP2015/055163, filed Mar. 12, 2015, which claims priority to EP 14161181.4, filed Mar. 21, 2014, the entire contents of each are incorporated herein by reference.

BACKGROUND

Field

The present disclosure relates to telecommunications apparatus and methods, and in particular to telecommunications apparatus and methods for use in wireless telecommunications systems in which terminal devices are configured to perform device-to-device communications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within reliable coverage of a network. In order to address these limitations there have been proposed approaches in which terminal devices (communications devices) within a wireless telecommunications system may be configured to communicate data directly with one another without some or all communications passing through an infrastructure equipment element, such as a base station. Such communications are commonly referred to as a device-to-device (D2D) communications. It is expected that D2D communications will be introduced in LTE release-12.

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently communicated between communications devices by obviating the need for user data to be relayed by a network entity such as a base station, and also allows communications devices that are in sufficiently close proximity to communicate with one another when one or both devices may not be within the reliable coverage area of a network. The ability for communications devices to operate both inside and outside of coverage areas makes LTE systems that incorporate D2D capabilities well suited to applications such as public safety communications, for example. Public safety communications may benefit from a high degree of robustness whereby devices can continue to communicate with one another in congested networks and when outside a coverage area.

Fourth generation networks have therefore been proposed as a cost effective solution to public safety communications compared to dedicated systems such as TETRA (terrestrial trunked radio) which are currently used throughout the world.

The inventors have recognised one issue for consideration for D2D communications is how much radio resource should be reserved for supporting D2D communications in a wireless telecommunications network. A wireless telecommunications network generally supports communications over a wireless access interface comprising an array (grid) of time and frequency resources. In order to support D2D communications, at least in some modes of D2D operation, it is expected that a portion of a network's available resources will be reserved for D2D use. Radio resources which are reserved for supporting D2D communications in this way may sometimes be referred to herein as a D2D resource pool. The inventors have recognised in particular that the size of a D2D pool in a given implementation can be an important consideration for optimising network operation.

On the one hand, a relatively large D2D pool can support a correspondingly large amount of D2D communications, but with a corresponding large reduction in resources available for other communications in the network. This means if the resources comprising the D2D pool are not being used for D2D communications, the D2D pool will to some extent represent a waste of at least some resources in the network. On the other hand, a relatively small D2D pool will have a correspondingly smaller impact on the resources available for other communications, but gives rise to increased likelihood of congestion in respect of D2D communications. That is to say, there can be expected to be an increased chance of a device being unable to access resources to make D2D communications because the resources reserved for D2D communications (i.e. the D2D resource pool) are already allocated for use by other D2D devices. Public safety related activities are expected to represent one significant application of D2D communications, and for these applications it can be particularly important to avoid congestion.

The inventors have thus recognised a need for apparatus and methods for helping to make more efficient use of radio resources in networks supporting D2D communications while also helping to reduce the extent of D2D congestion in such systems.

SUMMARY

According to one aspect of the present disclosure, there is provided a method of operating a network entity in a wireless telecommunication system supporting device-to-device, D2D, communications between terminal devices, the method comprising: establishing a set of radio resources to be made available for D2D communications within the wireless telecommunication system; communicating an indication of the set of radio resources to terminal devices operating in the wireless telecommunications system; determining an indication of an extent to which the set of radio resources is being used for D2D communications; establishing an updated set of radio resources to be made available for D2D communications within the wireless telecommunication system based on the indication of the extent to which the set of radio resources is being used for D2D communications; and communicating an indication of the updated set of radio resources to terminal devices operating within the wireless telecommunications system.

According to another aspect of the present disclosure, there is provided a network entity for use in a wireless telecommunication system supporting device-to-device, D2D, communications between terminal devices, wherein the network entity comprises a controller unit and a transceiver unit configured to operate together to: establish a set of radio resources to be made available for D2D communications within the wireless telecommunication system; communicate an indication of the set of radio resources to terminal devices operating in the wireless telecommunications system; determine an indication of an extent to which the set of radio resources is being used for D2D communications; establish an updated set of radio resources to be made available for D2D communications within the wireless telecommunication system based on the indication of the extent to which the set of radio resources is being used for D2D communications; and communicate an indication of the updated set of radio resources to terminal devices operating within the wireless telecommunications system.

According to another aspect of the present disclosure, there is provided circuitry for a network entity for use in a wireless telecommunication system supporting device-to-device, D2D, communications between terminal devices, wherein the circuitry comprises a controller element and a transceiver element configured to operate together to cause the network entity to: establish a set of radio resources to be made available for D2D communications within the wireless telecommunication system; communicate an indication of the set of radio resources to terminal devices operating in the wireless telecommunications system; determine an indication of an extent to which the set of radio resources is being used for D2D communications; establish an updated set of radio resources to be made available for D2D communications within the wireless telecommunication system based on the indication of the extent to which the set of radio resources is being used for D2D communications; and communicate an indication of the updated set of radio resources to terminal devices operating within the wireless telecommunications system.

According to another aspect of the present disclosure, there is provided a method of operating a terminal device in a wireless telecommunication system supporting device-to-device, D2D, communications between terminal devices, the method comprising: receiving an indication of a set of radio resources available for D2D communications within the wireless telecommunication system from a network entity; determining an indication of an extent to which the set of radio resources is being used for D2D communications; and transmitting the indication of the extent to which the set of radio resources is being used for D2D communications to the network entity.

According to another aspect of the present disclosure, there is provided a terminal device for use in a wireless telecommunication system supporting device-to-device, D2D, communications between terminal devices, wherein the terminal device comprises a controller unit and a transceiver unit configured to operate together to: receive an indication of a set of radio resources available for D2D communications within the wireless telecommunication system from a network entity; determine an indication of an extent to which the set of radio resources is being used for D2D communications; and transmit the indication of the extent to which the set of radio resources is being used for D2D communications to the network entity.

According to another aspect of the present disclosure, there is provided circuitry for a terminal device for use in a wireless telecommunication system supporting device-to-device, D2D, communications between terminal devices, wherein the circuitry comprises a controller element and a transceiver element configured to operate together to cause the terminal device to: receive an indication of a set of radio resources available for D2D communications within the wireless telecommunication system from a network entity; determine an indication of an extent to which the set of radio resources is being used for D2D communications; and transmit the indication of the extent to which the set of radio resources is being used for D2D communications to the network entity.

According to another aspect of the present disclosure, there is provided a method of operating a terminal device in a wireless telecommunication system supporting device-to-device, D2D, communications between terminal devices, the method comprising: receiving an indication of a set of radio resources available for D2D communications within the wireless telecommunication system from a network entity; monitoring the set of radio resources to determine if another terminal device is seeking to communicate with the terminal device in a D2D manner using the set of radio resources; receiving an indication of an updated set of radio resources available for D2D communications within the wireless telecommunication system from the network entity; and monitoring the updated set of radio resources to determine if another terminal device is seeking to communicate with the terminal device in a D2D manner using the set of radio resources.

According to another aspect of the present disclosure, there is provided a terminal device for use in a wireless telecommunication system supporting device-to-device, D2D, communications between terminal devices, wherein the terminal device comprises a controller unit and a transceiver unit configured to operate together to: receive an indication of a set of radio resources available for D2D communications within the wireless telecommunication system from a network entity; monitor the set of radio resources to determine if another terminal device is seeking to communicate with the terminal device in a D2D manner using the set of radio resources; receive an indication of an updated set of radio resources available for D2D communications within the wireless telecommunication system from the network entity; and monitor the updated set of radio resources to determine if another terminal device is seeking to communicate with the terminal device in a D2D manner using the set of radio resources.

According to another aspect of the present disclosure, there is provided circuitry for a terminal device for use in a wireless telecommunication system supporting device-to-device, D2D, communications between terminal devices, wherein the circuitry comprises a controller element and a transceiver element configured to operate together to cause the terminal device to: receive an indication of a set of radio resources available for D2D communications within the wireless telecommunication system from a network entity; monitor the set of radio resources to determine if another terminal device is seeking to communicate with the terminal device in a D2D manner using the set of radio resources; receive an indication of an updated set of radio resources available for D2D communications within the wireless telecommunication system from the network entity; and monitor the updated set of radio resources to determine if another terminal device is seeking to communicate with the terminal device in a D2D manner using the set of radio resources.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
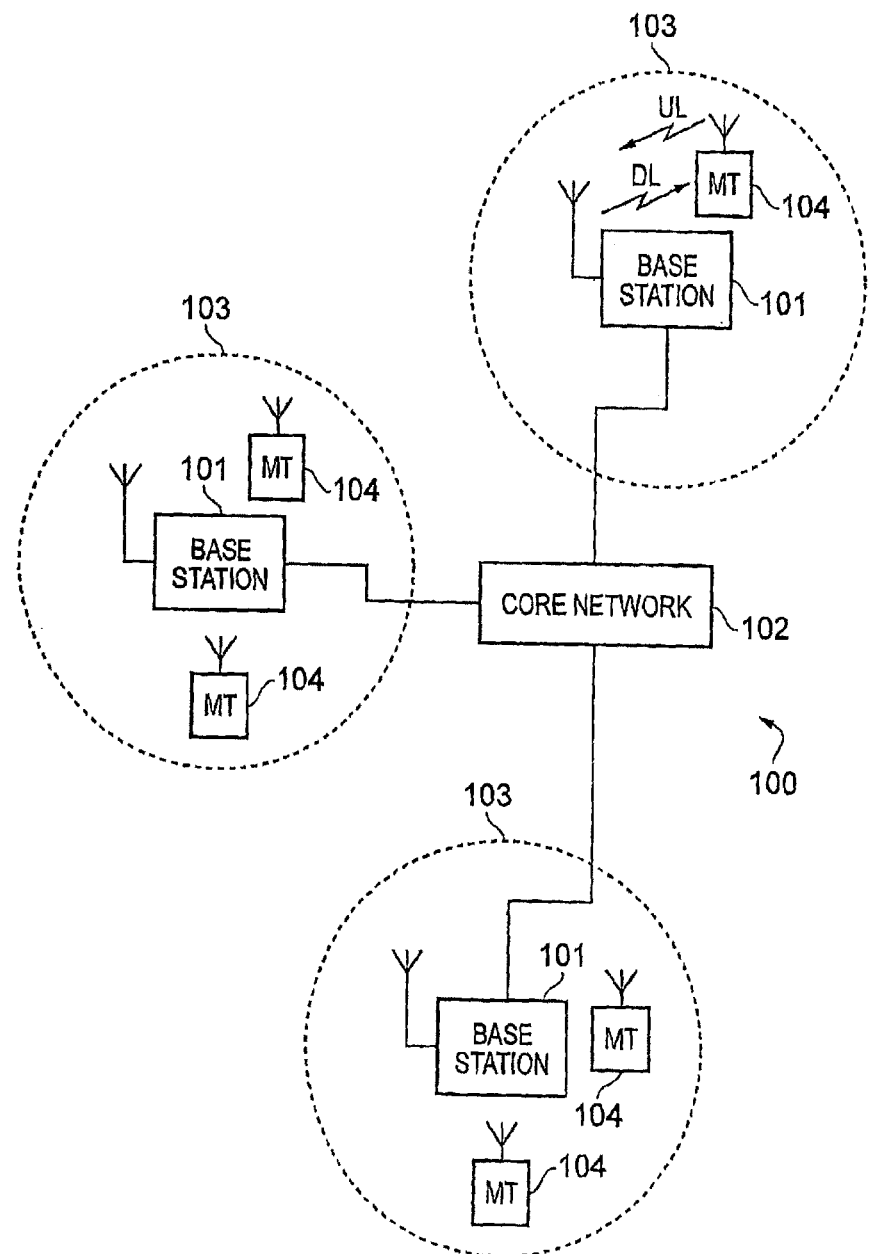
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body and also described in many books on the subject, for example, Holma H. and Toskala A [1]. It will be appreciated that operational aspects of the telecommunications network which are not specifically described below may be implemented in accordance with any known techniques, for example according to the relevant standards or variations thereof.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
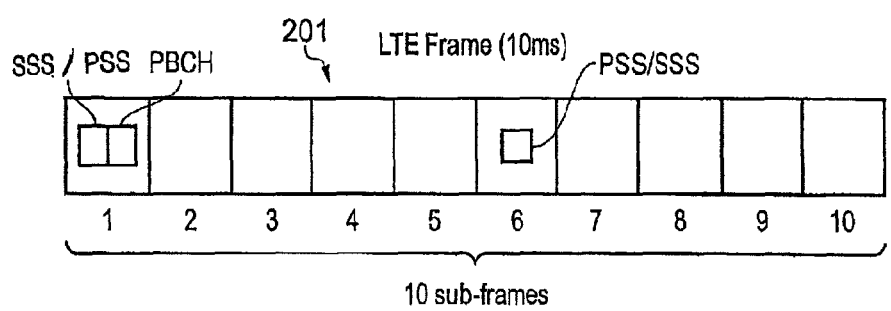
FIG. 2 provides a schematic diagram illustrating a LTE downlink radio frame.

FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
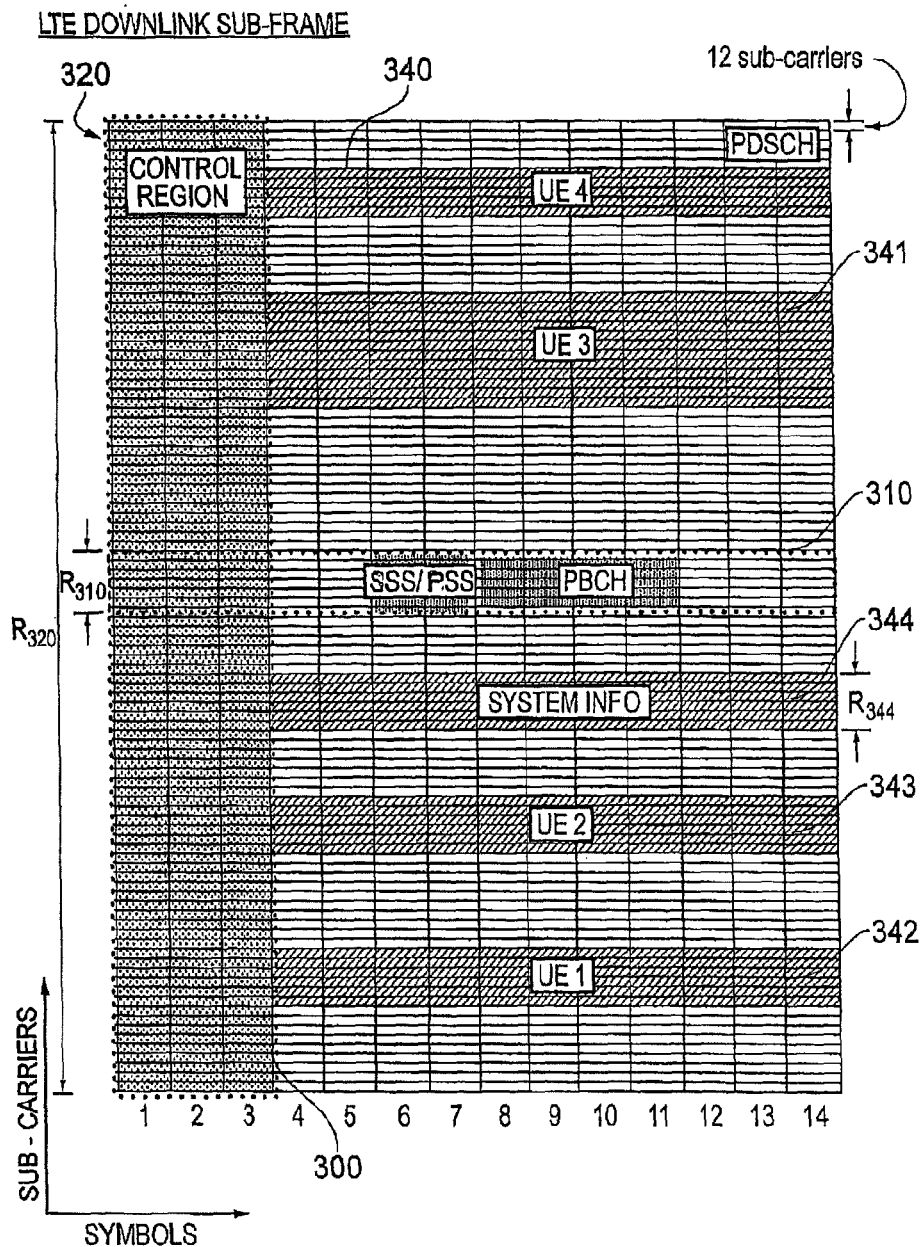
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth and in this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated by a base station to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are discussed further below but not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

Figure 4:
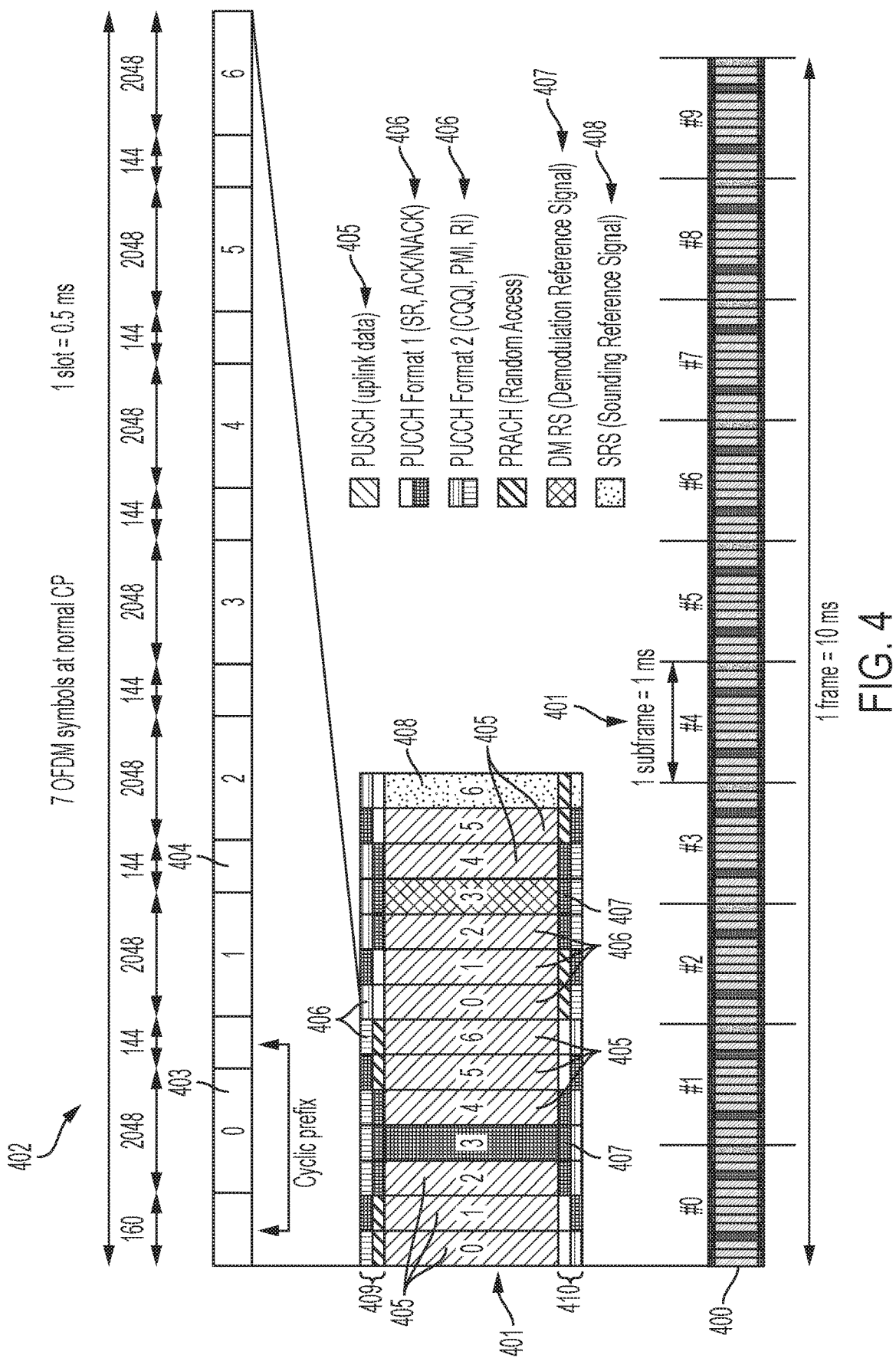
FIG. 4 provides a schematic diagram illustrating an example of a LTE uplink radio subframe.

FIG. 4 is a schematic diagram which illustrates some aspects of the structure of an example conventional uplink LTE subframe. In LTE networks the uplink wireless access interface is based upon a single carrier frequency division multiple access (SC-FDMA) interface and downlink and uplink wireless access interfaces may be provided by frequency division duplexing (FDD) or time division duplexing (TDD), where in TDD implementations subframes switch between uplink and downlink subframes in accordance with predefined patterns an in FDD implementations the uplink and downlink channels are separated by frequency. Regardless of the form of duplexing used, a common uplink frame structure is utilised. The simplified representation of FIG. 4 illustrates such an uplink frame at different levels of resolution with a frame of the uplink frame structure represented at the bottom of the figure, a subframe represented in the middle of the figure, and a slot represented at the top of the figure. Thus the frame 400 is divided in to 10 subframes 401 of 1 ms duration where each subframe 401 comprises two slots 402 of 0.5 ms duration. Each slot is then formed from seven OFDM symbols 403 (numbered 0 to 6 in FIG. 4) where a cyclic prefix 404 is inserted between each symbol. In FIG. 4 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a broadly similar manner to downlink subframes.

As is well known, each uplink subframe may include a plurality of different channels, for example a physical uplink shared channel (PUSCH) 405, a physical uplink control channel (PUCCH) 406, which may take various formats, and a physical random access channel (PRACH). The physical Uplink Control Channel (PUCCH) may carry control information such as ACK/NACK to the base station for downlink transmissions, scheduling request indicators (SRI) for terminal devices wishing to be scheduled uplink resources, and feedback of downlink channel state information (CSI) for example. The PUSCH may carry terminal device uplink data or some uplink control data. Resources of the PUSCH are granted via PDCCH, such a grant being typically triggered by communicating to the network the amount of data ready to be transmitted in a buffer at the terminal device. The PRACH may be scheduled in any of the resources of an uplink frame in accordance with one of a plurality of PRACH patterns that may be signalled to terminal device in downlink signalling such as system information blocks. As well as physical uplink channels, uplink subframes may also include reference signals. For example, demodulation reference signals (DMRS) 407 and sounding reference signals (SRS) 408 may be present in an uplink subframe where the DMRS occupy the fourth symbol of a slot in which PUSCH is transmitted and are used for decoding of PUCCH and PUSCH data, and where SRS are used for uplink channel estimation at the base station. Further information on the structure and functioning of the physical channels of LTE systems can be found in reference [1].

In an analogous manner to the resources of the PDSCH for downlink communications, resources of the PUSCH for uplink communications are scheduled or granted by the serving base station. Thus for data is to be transmitted by a terminal device, resources of the PUSCH are granted to the terminal device by the base station. At a terminal device, PUSCH resource allocation is achieved by the transmission of a scheduling request or a buffer status report to its serving base station. The scheduling request may be made, when there is insufficient uplink resource for the terminal device to send a buffer status report, via the transmission of Uplink Control Information (UCI) on the PUCCH when there is no existing PUSCH allocation for the terminal device, or by transmission directly on the PUSCH when there is an existing PUSCH allocation for the terminal device. In response to a scheduling request, the base station is configured to allocate a portion of the PUSCH resource to the requesting terminal device sufficient for transferring a buffer status report and then inform the terminal device of the buffer status report resource allocation via a DCI in the PDCCH.

Although similar in overall structure to downlink subframes, uplink subframes have a different control structure to downlink subframes, in particular an upper region 409 and a lower region 410 of subcarriers/frequencies/resource blocks of an uplink subframe are reserved for control signalling (as opposed to the initial symbols for a downlink subframe). Furthermore, although the resource allocation procedure for the downlink and uplink are similar, the actual structure of the resources that may be allocated may vary due to the different characteristics of the OFDM and SC-FDMA interfaces used in the downlink and uplink respectively. For example, for OFDM each subcarrier may be individually modulated and therefore it is not particularly significant whether frequency/subcarrier allocations are contiguous. However, for SC-FDMA the subcarriers are modulated in combination and therefore it can be more efficient to allocate contiguous frequency allocations for each terminal device.

As a result of the above described wireless interface structure and operation, one or more terminal devices may communicate data with one another via a coordinating base station, thus forming a conventional cellular telecommunications system. However, as noted above, there are also approaches for additionally allowing terminal devices to communicate directly with one another (i.e. without communications passing through a coordinating base station) using so-called device-to-device (D2D) modes of operation. As explained further below, it is expected that in at least some modes of D2D operation a subset of a network's radio resources will be reserved for D2D communications. Certain embodiments of the disclosure provide schemes for helping to establish an appropriate amount of radio resources to reserve for D2D communications in a wireless telecommunications system having regard to an amount of D2D communications (e.g. based on a measured/predicted characteristic of D2D traffic.

Figure 5:
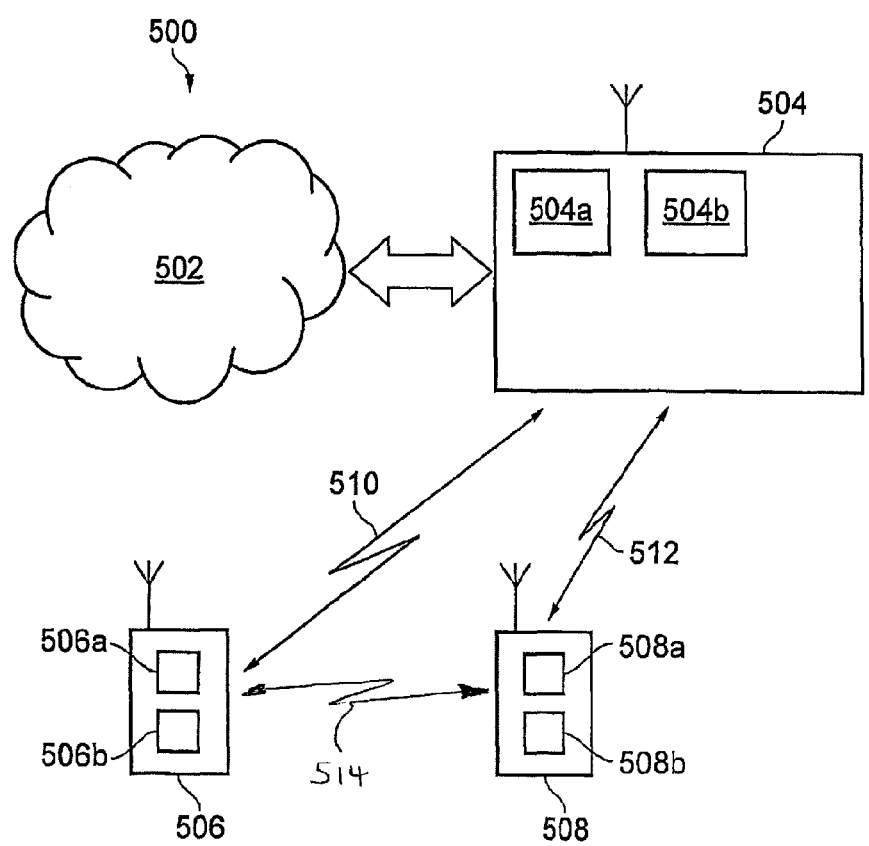
FIG. 5 schematically represents a wireless telecommunications system according to an embodiment of the disclosure.

FIG. 5 schematically shows a telecommunications system 500 according to an embodiment of the disclosure. The telecommunications system 500 in this example is based broadly on a LTE-type architecture with modifications to support device-to-device communications (i.e. direct signalling exchange between terminal devices to communicate data between them) generally in accordance with previously proposed schemes for D2D communications. As such many aspects of the operation of the telecommunications system 500 are already known and understood and not described here in detail in the interest of brevity. Operational aspects of the telecommunications system 500 which are not specifically described herein may be implemented in accordance with any known techniques, for example according to the established LTE-standards and known variations and modifications thereof (e.g. to provide/introduce support for D2D communications).

The telecommunications system 500 comprises a core network part (evolved packet core) 502 coupled to a radio network part. The radio network part comprises a base station (evolved-nodeB) 504, a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the disclosure as discussed herein.

The first and second terminal devices 506, 508 are D2D enabled devices configured to operate in accordance with embodiments of the present disclosure as described herein. The terminal devices 506, 508 each comprise a transceiver unit 506a, 508a for transmission and reception of wireless signals and a controller unit 506b, 508b configured to control the respective terminal devices 506, 508. The respective controller units 506b, 508b may each comprise a processor unit which is suitably configured/programmed to provide the desired functionality using conventional programming/configuration techniques for equipment in wireless telecommunications systems. The respective transceiver units 506a, 508a and controller units 506b, 508b are schematically shown in FIG. 5 as separate elements. However, it will be appreciated for each of the terminal devices the functionality of the terminal devices receiver and controller units can be provided in various different ways, for example using a single suitably programmed general purpose computer, or suitably configured application-specific integrated circuit(s)/circuitry. It will be appreciated the first and second terminal devices 506, 508 will in general comprise various other elements associated with their operating functionality in accordance with established wireless telecommunications techniques (e.g. a power source, possibly a user interface, and so forth).

The base station 504 is configured to support D2D communications between terminal devices in accordance with embodiments of the present disclosure as described herein. The base station 504 comprises a transceiver unit 504a for transmission and reception of wireless signals and a controller unit 504b configured to control the base station 504. The controller unit 504b may comprise a processor unit which is suitably configured/programmed to provide the desired functionality using conventional programming/configuration techniques for equipment in wireless telecommunications systems. The transceiver unit 504a and the controller unit 504b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 504 will in general comprise various other elements associated with its operating functionality. For example, the base station 504 will in general comprise a scheduling entity responsible for scheduling communications. The functionality of the scheduling entity may, for example, be subsumed by the controller unit 504b.

Thus, the base station 504 is configured to communicate data with the first terminal device 506 over a first radio communication link 510 and communicate data with the second terminal device 508 over a second radio communication link 512. Both radio links may be supported within a single radio frame structure associated with the base station 504. It is assumed here the base station 504 is configured to communicate with the terminal devices 506, 508 over the respective radio communication links 510, 512 generally in accordance with the established principles of LTE-based communications.

However, in addition to the terminal devices 506, 508 being arranged to communicate data to and from the base station (transceiver station) 504 over the respective first and second radio communication links 510, 512, the terminal devices are further arranged to communicate with one another (and other terminal devices within the wireless telecommunications system) in a device-to-device (D2D) manner over a D2D radio communication link 514, as schematically indicated in the figure. The underlying principles of the D2D communications supported in the wireless telecommunications system of FIG. 5 may follow any previously proposed techniques, but with modifications to support approaches in accordance with embodiments of the disclosure as described herein.

There are a number of possible approaches to the implementation of D2D communications within an LTE-based wireless telecommunications system that have been proposed for different scenarios.

Some approaches may rely on a coordinating entity, such as a base station or other network entity, to allocate specific transmission resources for use by respective terminal devices to transmit data. For example, resources within the wireless access interface provided for communications between terminal devices and a base station may be used for D2D communications and a base station may allocate resources for specific D2D communications.

That is to say, the base station may be responsible for scheduling which terminal devices transmit D2D communications on which resources in a broadly similar manner to the way in which the base station is responsible for scheduling conventional uplink communications. Thus terminal devices may receive control signalling from the base station to indicate which resources they should use for transmitting user data to another terminal device in a D2D manner. This type of approach may generally be referred to as a Mode 1 approach.

Other approaches may not rely on any coordinating entity for managing access to radio resources by terminal devices undertaking D2D communications. For example it has been proposed in document R2-133840 [2] to use a Carrier Sense Multiple Access, CSMA, approach to provide a degree of co-ordination for D2D transmissions by terminal devices through contention based scheduling by each terminal device. In effect each terminal device first listens to identify which resources are currently being used, and then schedules its own transmissions on unused resources. This type of approach may generally be referred to as a Mode 2 approach.

Thus, in some respects, a Mode 1 approach may be seen as an approach in which access to resources for D2D communications is scheduled by a coordinating entity whereas a Mode 2 approach may be seen as an approach in which access to resources for D2D communications are not scheduled by a coordinating entity and are contention based.

Some proposed arrangements include those in which a terminal device acts as a controlling entity for a group of terminal devices to co-ordinate transmissions of the other members of the group. Examples of such proposals are provided in the following disclosures:

[3] R2-133990, Network control for Public Safety D2D Communications; Orange, Huawei, HiSilicon, Telecom Italia

[4] R2-134246, The Synchronizing Central Node for Out of Coverage D2D Communication; General Dynamics Broadband UK

[5] R2-134426, Medium Access for D2D communication; LG Electronics Inc

In some respects these approaches may be seen as variations of a Mode 1 approach in which a "master" terminal device plays a role corresponding to that of a base station in allocating (scheduling) D2D resources among terminal devices wishing make D2D communications.

In other arrangements one of the terminal devices of a group may first send a scheduling assignment, and then transmit data without a central scheduling terminal device or controlling entity controlling the transmissions. The following disclosures provide examples of this de-centralised arrangement:

[6] R2-134238, D2D Scheduling Procedure; Ericsson;

[7] R2-134248, Possible mechanisms for resource selection in connectionless D2D voice communication; General Dynamics Broadband UK;

[8] R2-134431, Simulation results for D2D voice services using connectionless approach, General Dynamics Broadband UK In particular, the last two disclosures listed above, R2-134248 [7], R2-134431 [8], disclose the use of a scheduling channel, used by terminal devices to indicate their intention to schedule data along with the resources that will be used. The other disclosure, R2-134238 [6], does not use a scheduling channel as such, but deploys at least some predefined resources to send the scheduling assignments. These approaches may be seen as Mode 2 type approaches.

Other example arrangements disclosed in [9] and [10] require a base station to provide feedback to the communications devices to control their transmissions. Document [11] discloses an arrangement in which a dedicated resource exchanging channel is provided between cellular user equipment and device-to-device user equipment for interference control and resource coordination.

It is to be expected that device-to-device communications when implemented in the context of an existing LTE-based wireless telecommunications network will use transmission resources associated within the existing LTE radio interface. In particular, it is expected that device-to-device communications will use radio resources from within the existing LTE uplink frame structure. There are various reasons for this. For example, traffic profiles in wireless telecommunications systems are typically such that an uplink channel is more likely to have more spare capacity then a downlink channel. Furthermore, the downlink channel is associated with more powerful transmissions from a base station and these are more likely to swamp and interfere with device-to-device communications.

One factor that is expected to be significant in determining the manner in which terminal devices undertake D2D communications is the extent to which the terminal devices are within network coverage. For example, terminal devices which are outside network coverage may be expected to operate according to Mode 2 in the absence of any coordinating information from a base station (although such terminal device could operate in accordance with Mode 1 with a terminal device taking on the role of centralised scheduling/coordination). Terminal devices within network coverage might be expected to operate according to Mode 1, since centralised control will generally provide improved performance (example with reduced contention). Furthermore, in some circumstances there may be terminal devices undertaking D2D communications while they are in an area of poor coverage, for example at a cell edge. In this respect the terminal devices may be able to receive some communications from the base station, for example system information broadcasts, but may not be able to reliably receive other routine communications, for example resource allocation signalling. In this scenario the terminal devices may operate according to Mode 2, but nonetheless receive some configuration information from the base station regarding the overall resources available for supporting D2D communications in the wireless telecommunications system.

It is expected that D2D communications within a cell served by a base station will be restricted to a subset of transmission resources (in terms of times and/or frequency) selected from the overall range of transmission resources available in the cell. For example, if a base station in a cell is configured to operate over a 20 MHz bandwidth LTE radio subframe (e.g. for supporting uplink communications across the radio communication links 510, 512 represented in FIG. 5), it is expected that D2D communications between the terminal devices will be restricted to a pool of resources taken from within the cell's overall transmission resources. Furthermore, it is expected for some implementations the pool of transmission resources to be used for supporting D2D communications (e.g. the radio communication link 514 in FIG. 5) will not be available for supporting conventional uplink/downlink signalling (e.g. the radio communication links 510, 512 in FIG. 5). In this regard the set (pool) of resources to be made available for supporting D2D communications may be considered as being reserved for D2D communications.

Thus to summarise, a portion of the transmission resources (e.g. one or more blocks of time and/or frequency) that would otherwise be available for communications between the base station and terminal devices in a system which did not support D2D communications may be reserved for communications between terminal devices in a wireless telecommunications system which does support D2D communications. The specific resources reserved for D2D communications in terms of time and frequency resources may come from the base station's conventional uplink or downlink resources. However, as noted above, it is more likely to come from the uplink resources. Furthermore, the manner in which the resources are spread throughout the communication cell's overall operating bandwidth may be different in different implementations. In some cases the pool of resources reserved for D2D communications may be contiguous in time and frequency (e.g. corresponding to a continuous band of resources within a frame structure such as represented in FIG. 4, for example). In other cases the pool of resources for supporting D2D communications may be non-contiguous in time and/or frequency. For example, in one implementation the transmission resources reserved for D2D communications may comprise a continuous band of frequencies within the overall cell bandwidth, but D2D communications may not be available in every (sub)frame. In another example, the D2D communications may be supported in every subframe, but may use non-contiguous frequencies. More generally, once an amount of resources to reserve for D2D operation has been established in accordance with the principles described herein, the specific arrangement of the transmission resources in terms of times and frequencies that are reserved is not significant. Furthermore, the nature of the physical layer signalling and protocols adopted for D2D communications between terminal devices using the D2D pool of transmission resources is also not significant to the principles of operation described herein. For example, D2D communications may be based on blocks of time and frequency corresponding to those used in a conventional LTE system, or a different system may be used.

However, as noted above, the inventors have recognised one issue for consideration for D2D communications is how much radio resource should be reserved for supporting D2D communications in a wireless telecommunications network. If a pool is too small, there will be an increased risk of congestion/collision. However if a resource pool is too large, it may represent an under-utilised (i.e. wasted) portion of transmission resources that might otherwise be used for conventional non-D2D communications.

With this in mind, there is proposed an approach for dynamically adapting the amount of resources available for D2D communications in a wireless telecommunications system. In broad summary a network entity, for example a base station, may be responsible for establishing a set of resources to be available for D2D communications and convey an indication of this to terminal devices operating in the system. The network entity may then obtain information regarding the extent to which the resources that are currently set aside for D2D communications are being used, i.e. the network entity may obtain information regarding the degree of utilisation of the resources currently made available for D2D communications. If the network entity determines the D2D resources are being under-utilised (e.g. with a fractional utilisation less than a lower threshold amount, for example lower than 0.7, 0.6, 0.5, 0.4 or 0.3, or lower), it may reduce the amount of resources reserved for D2D operations (and communicate this to the terminal devices accordingly). This frees up a portion of the resources previously reserved for D2D communications for non-D2D traffic. If, on the other hand, the network entity determines the D2D resources are being over-utilised (e.g. with a fractional utilisation greater than an upper threshold amount, for example higher than 0.5, 0.6, 0.7, 0.8 or 0.9, or more), it may increase the amount of resources reserved for D2D operations (and communicate this to the terminal devices accordingly). This can help reduce the risk of D2D traffic congestion.

There are various different ways in which a network entity, for example the base station 504 represented in FIG. 5, can obtain information regarding the extent to which transmission resources set aside for D2D operation are being utilised to allow it to respond by changing the amount of resources allocated for D2D operation, as now described.

Figure 6:
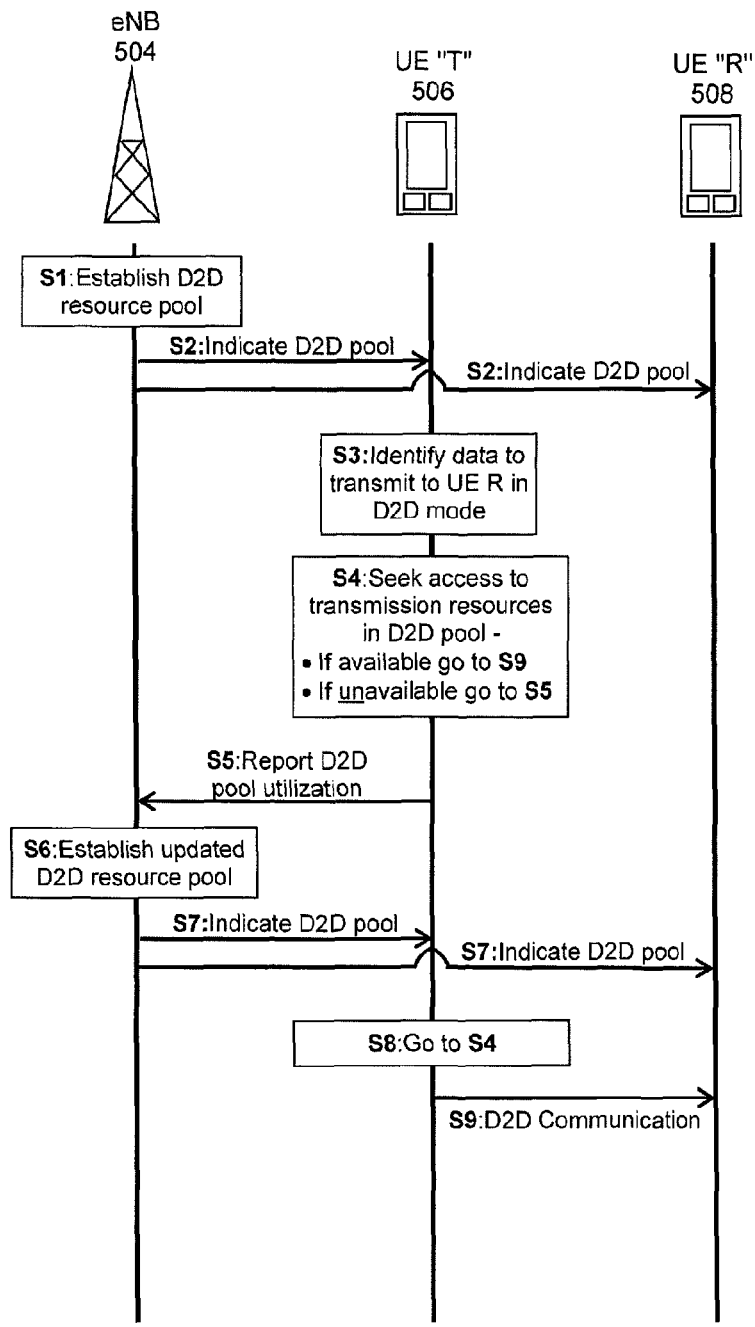
FIGS. 6 to 8 are ladder diagrams schematically representing methods of operation in accordance with certain embodiments of the disclosure.

FIG. 6 is a ladder diagram schematically representing signalling exchange between the base station 504, and the terminal devices 506, 508 schematically represented in FIG. 5 in accordance with certain embodiments of the disclosure. It is assumed here for the sake of example the terminal devices 506, 508 are exchanging D2D communications, with the terminal device 506 transmitting and the terminal device 508 receiving. In this regard the terminal device 506 may be referred to as the transmitting terminal device (UE "T") while the terminal device 508 may be referred to as the receiving terminal device (UE "R").

In step S1 the base station 504 establishes an initial D2D resource pool. This is a set of transmission resources which are to be made available/reserved for D2D operation. This step may be performed in response to the base station undergoing a switch on or reset procedure in respect of its support for D2D communications. The initial size of the D2D resource pool established in step S1 and the manner in which it is determined is not overly significant. For example, the initial D2D resource pool established in step S1 may correspond with a predefined set of transmission resources.

In step S2 the base station transmits an indication of the set of resources comprising the D2D transmission resource pool established in step S1 to the terminal devices. This information may, for example, be transmitted in accordance with established techniques for communicating configuration information in wireless telecommunications systems, for example through system information block (SIB) signalling in an LTE-based network. As schematically indicated in FIG. 6, both the transmitting terminal device 506 and the receiving terminal device 508 receive this information. Generally speaking, terminal devices which are to make D2D transmissions in accordance with Mode 2 operations acquire this information to allow them to select transmission resources for their transmissions. However, terminal devices which may receive D2D transmissions but do not expect to make D2D transmissions may nonetheless also acquire this information so they determine what resources to monitor for D2D transmissions addressed to them (this applies for both Mode 1 and Mode 2 operation).

Thus, at the end of step S2, a D2D resource pool has been established and communicated to the terminal devices 506, 508.

In step S3 the transmitting terminal device 506 identifies that it has data to transmit to the receiving terminal device 508 in a D2D mode. For the sake of example, it is assumed here the transmitting terminal device and the receiving terminal device support a "walkie-talkie" mode, and step S3 corresponds with a user of the transmitting terminal device 506 pressing a button to indicate they are about to begin talking to a user of the receiving terminal device 508 (and potentially other terminal devices in a broadcast walkie-talkie mode). However, it will be appreciated the exact nature of the data to be transmitted the trigger for transmission are not significant.

In step S4 the transmitting terminal device seeks to access resources within the set of transmission resources set aside for D2D communications (the D2D pool). The exact mechanism and protocols used to do this will depend on the specific D2D implementation at hand. For example, any of the known approaches discussed above may be adopted, for example a "wait and listen"/CSMA type approach may be used.

If in step S4 the transmitting terminal device is able to access transmission resources in the D2D pool (i.e. there are resources available for use by the transmitting terminal device), processing may proceed to step S9, where the D2D communications between the transmitting terminal device 506 and the receiving terminal device 508 may proceed in accordance with whichever D2D protocols are adopted for the implementation at hand.

However, if in step S4 the transmitting terminal device identifies that it has faced a restriction in its attempts to access (or at least claim access to) transmission resources within the D2D resource pool, for example because all the D2D resources are already allocated for use by other terminal devices such that the transmitting terminal device cannot access any transmission resources, processing proceeds to step S5.

In step S5 the transmitting terminal device transmits a report to the base station indicating it has had difficulty accessing the transmission resources within the D2D pool. This signalling may be exchanged in accordance with conventional reporting techniques, for example using radio resource control, RRC, signalling techniques. The exact nature of the report is not significant. For example, the report may simply convey an indication the terminal device 506 has tried and failed to make a D2D transmission because there were insufficient resources available. In some examples the indication the transmitting terminal device's attempt to access the transmission resources within the D2D pool was in some way restricted may be communicated to the base station in association with a connections establishment procedure, for example in association with Connection Setup Complete signalling. In some example implementations, certain aspects of report signalling of the kind represented in step S5 may be configured through system information signalling.

The signalling exchanged step S5 in effect corresponds to the base station receiving a feedback report from the terminal device indicating the extent to which the D2D resource pool is currently (or at least at the time of S4) being utilised. In this example where the terminal device 506 transmits the signalling in step S5 in response to a failure to access any transmission resources, the indication is in effect an indication of 100% utilisation for the D2D resource pool, at least in the vicinity of the transmitting terminal device.

In step S6 the base station responds to the feedback indicating the resource pool is over-utilised by establishing an updated resource pool comprising more transmission resources. For example, in one implementation it may be established that an optimum level of utilisation is 70% (0.7 fractional utilisation), and so the base station may increase the size of the D2D resource pool (i.e. the amount of transmission resources to be set aside for D2D communications) by an amount the order of 1/0.7 (i.e. 1.4). However, the exact extent to which the resource pool is increased will be a matter of implementation. For example, in a wireless telecommunications system where there is expected to be only steady and slow changes in the extent to which the D2D communications are utilised, a relatively low increase may be considered appropriate, for example 10% or 20%, in the expectation that it is unlikely the new larger resource pool will itself rapidly become over-utilised. However, in a wireless telecommunication system in which there is expected to be a greater degree of variation in D2D utilisation, a larger increase may be considered appropriate to more readily accommodate peaks in D2D communications.

In Step S7, and in a manner similar to step S2, the base station transmits an indication of the updated set of resources comprising the D2D transmission resource pool established in step S6 to the terminal devices. Again, this information may be transmitted in accordance with any established techniques for communicating configuration information in wireless telecommunications systems, such as system information signalling.

Thus, at the end of step S7, an updated D2D resource pool has been established and communicated to the terminal devices 506, 508.

On receiving the updated D2D resource pool in step S7, the receiving terminal device 508 begins monitoring the updated D2D resources for potential transmissions, whereas prior to this it will have monitored the set of resources comprising the previously determined set of resources (established in step S1).

On receiving the updated D2D resource pool in step S7, the transmitting terminal device 506 in effect returns to step S4 where it attempts to gain to access to resources from the (now updated) D2D resource pool to make its transmission to the receiving terminal device 508. If the transmitting terminal device is successful in claiming access to resources from the newly-updated D2D resource pool, processing proceed to step S9. In step S9 the D2D communications can take place using the relevant resources from the D2D resource pool in accordance with whichever D2D protocols are adopted for the implementation at hand. However, if the transmitting terminal device 506 again fails to identify transmission resources available for it to use within the D2D pool, processing may proceed to step S5 and so on as discussed above.

After sending the utilisation report in step S5, and before receiving the indication of the updated D2D resource pool in step S7, the terminal device 506 might make further attempts to access resources within the original D2D resource pool, for example, in association with a back-off timer, since resources may become available in the meantime. Furthermore, the transmitting terminal device 506 might attempt to obtain resources to communicate with the receiving terminal device in another manner, for example by requesting the base station allocate specific resources for it to use (i.e. in effect switching to Mode 1 operation), or attempting to use an alternate D2D resource pool if one is available.

It will be appreciated the approach of FIG. 6 will generally be performed in an iterative manner, and the description above has focused only on an initial iteration. That is to say, processing represented in FIG. 6 may in effect be continuously looped through in respect of all terminal devices seeking to make D2D transmissions in the wireless communication system.

Thus, FIG. 6 represents one mechanism whereby a base station may monitor the degree of utilisation of a D2D resource pool and adjust the size of the pool according to current utilisation. In some respects the approach of FIG. 6 is relatively coarse in providing a broadly binary indication of utilisation. That is to say, if the base station receives an over-utilisation report from a terminal device, it is made aware there has been an occurrence of 100% utilisation, whereas if the base station does not receive an over-utilisation report, it is made aware is not an occurrence of 100% utilisation, but the base station may not be aware of what utilisation is.

It will be appreciated the approach of FIG. 6 can be subject to various modifications. For example, in the approach described above, the transmitting terminal device 506 identified it was restricted from accessing resources in the D2D pool in step S4 by virtue of no resources being available so that its transmission failed. In other examples, the transmitting terminal device may successfully make its transmission, but determine that it was nonetheless restricted in some way, for example because it had to wait for more than a threshold amount of time before resources became available, or it identified that only a small fraction of the available resources remained available for use. Thus, in accordance with some examples the transmitting terminal device may proceed to make its D2D transmission, but nonetheless provide a feedback report to the base station to indicate there was some degree of restriction (e.g. a delay greater than a threshold duration, or less than a predefined threshold amount of resources remaining available for selection).

It will also be appreciated the manner in which the base station determines whether and how to establish an updated D2D resource pool may be different for different implementations. For example, in some cases the base station may react immediately to receiving an indication of over-utilisation, whereas in other cases the base station may wait to receive a number of indications of over-utilisation within a given time period before responding. That is to say, the base station may not react to a single isolated instance of over-utilisation, and may instead require multiple over-utilization reports from the same and/or from different terminal devices before reacting. Furthermore, in accordance with some examples of the approach represented in FIG. 6 there may be no ready mechanism provided for the base station to determine if the D2D resource pool is significantly under-utilised. Therefore, if there is a period of time greater than a predefined threshold during which the base station has not received any over-utilisation reports, the base station may proceed to reduce the size of the D2D resource pool (and inform the terminal devices accordingly), and continue doing this until an over-utilisation report is received. The base station may increase the D2D resource pool (e.g. in a step corresponding to step S6 in FIG. 6), and reset the timer for determining when it will again start to try reducing the size of the D2D pool in the absence of any over-utilisation reports.

Figure 7:
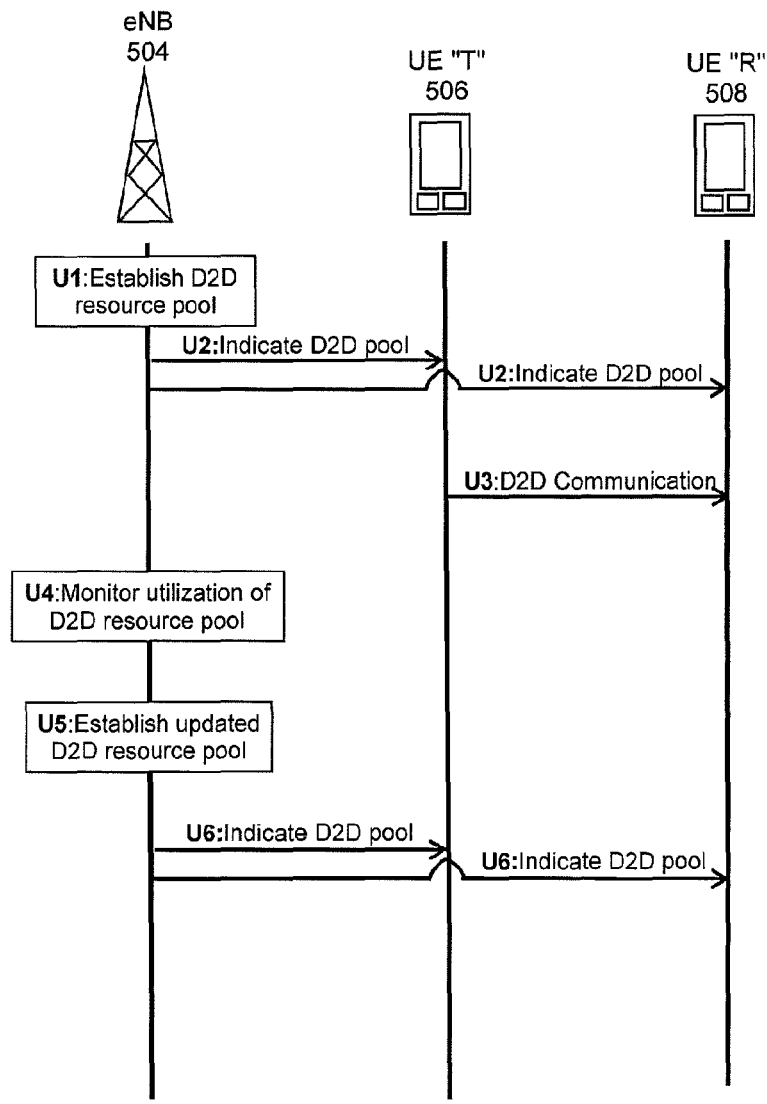

FIG. 7 is a ladder diagram schematically representing signalling exchange between the base station 504, and the terminal devices 506, 508 schematically represented in FIG. 5 in accordance with certain other embodiments of the disclosure. Various aspects of FIG. 7 are similar to, and will be understood from, corresponding aspects of FIG. 6 and are not described again in detail in the interests of brevity.

In step U1 the base station 504 establishes an initial D2D resource pool. This step corresponds with step U1 in FIG. 6.

In step U2 the base station transmits an indication of the set of resources comprising the D2D transmission resource pool established in step U1 to the terminal devices 506, 508. This step corresponds with step S2 in FIG. 6.

Thus, at the end of step U2, an initial D2D resource pool has been established and communicated to the terminal devices 506, 508.

It is assumed in this example the transmitting terminal device in fact has no difficulty accessing D2D resources from the available pool for communicating with the receiving terminal device in a D2D mode, and it proceeds to undertake D2D transmissions to the receiving terminal device in accordance with whichever D2D protocols are being implemented. This is schematically presented by step U3 in FIG. 7.

As schematically represented by step U4 in FIG. 7, the approach of FIG. 7 differs from that of FIG. 6 in that the base station 504 is configured to directly monitor utilisation of the D2D resource pool. The base station may do this, for example, by monitoring for transmissions being made on the reserved D2D resources, for example by monitoring for signalling signatures associated with D2D transmissions on the relevant resources, or simply measuring the power being transmitted in the cell on the relevant resources. The utilisation monitoring in step U4 thus provides the base station with an indication of the extent to which the D2D resources are being utilised.

In step U5 the base station establishes an updated D2D resource pool by taking account of the extent of D2D resource utilisation determined from the monitoring in step U4.

For example, the base station may be configured to seek to maintain a pre-defined fractional utilisation, such as somewhere between 60% and 80% (the desired fractional utilisation in any given implementation will typically depend on the extent of variation which is expected to occur on timeframes faster than the rate at which the D2D resource pool will be updated). To avoid overly frequent changes in the D2D resource pool, the base station may be configured to establish an updated D2D resource pool only if (1) the measured fractional utilisation in step U4 exceeds an upper threshold that is larger than the desired fractional utilisation, either instantaneously or for longer than a predefined duration, or (2) the measured fractional utilisation in step U4 falls below a lower threshold that is less than the desired fractional utilisation, either instantaneously or for longer than a predefined duration. In response to these conditions, the base station may increase or decrease the D2D resource pool size accordingly.

It will be appreciated the exact procedures and algorithms to be applied for determining when and what changes to the D2D resource pool should be made will depend on the application at hand. More generally, the optimisation procedures may be implemented in accordance with any known techniques for resource optimisation. What is significance in accordance with certain embodiments of the disclosure is the provision of schemes that allow for dynamic D2D resource pool allocation in response to D2D resource utilisation. The specific optimisation procedures adopted to define how the system should react in any given situation are less significant and will depend on the implementation at hand, for example depending on magnitudes and speed of expected variations in D2D traffic.

In Step U6, and in a manner similar to step U1, the base station transmits an indication of the updated set of resources comprising the D2D transmission resource pool established in step U5 to the terminal devices (assuming there has been an update). Again, this information may be transmitted in accordance with any established techniques for communicating configuration information in wireless telecommunications systems, such as system information signalling.

Thus, at the end of step U6, an updated D2D resource pool has been established and communicated to the terminal devices 506, 508. On receiving the updated D2D resource pool in step U6, the various terminal devices may begin monitoring the updated D2D resources for potential transmissions and may begin using the updated D2D resources for D2D transmissions.

Again it will be appreciated the approach of FIG. 7 will typically be incremented as an iterative approach, for example with the base station configured to perform monitoring in accordance with step U4, and potential resource pool updates in accordance with step U5, on an ongoing periodic basis.

An advantage of the approach represented in FIG. 7 as compared to the approach represented in FIG. 6 is the provision of a more refined indication of the extent of D2D resource utilisation. For example, in the example of FIG. 6 the base station is in effect provided with a simple binary indication of over-utilisation (i.e. over-utilisation signalling received from a terminal device) or non-over-utilisation (i.e. no over-utilisation signalling received). The approach of FIG. 7 allows a base station to generate a measure of actual utilisation, thereby allowing the base station to readily identify and react to situations of under-utilisation, and also to the system approaching over-utilisation before terminal devices start being unable to make D2D transmissions. However, a potential drawback with the approach of FIG. 7 in some situations is the possibility for the base station 504 to be unable to monitor all D2D transmissions occurring in its cell. For example, D2D transmissions between two closely spaced terminal devices at cell edge may be made with insufficient power for the base station to recognise the transmission is occurring. This means there is the potential for congestion that the base station does not recognise. Therefore a combination of the approaches of FIGS. 6 and 7 may be preferred in some implementations. This allows the more refined feedback for adaption provided by the base station monitoring approach represented in FIG. 7 to be used in conjunction with the failsafe approach of individual terminal devices being able to report if they are unable to make transmissions, as in FIG. 6.

Figure 8:
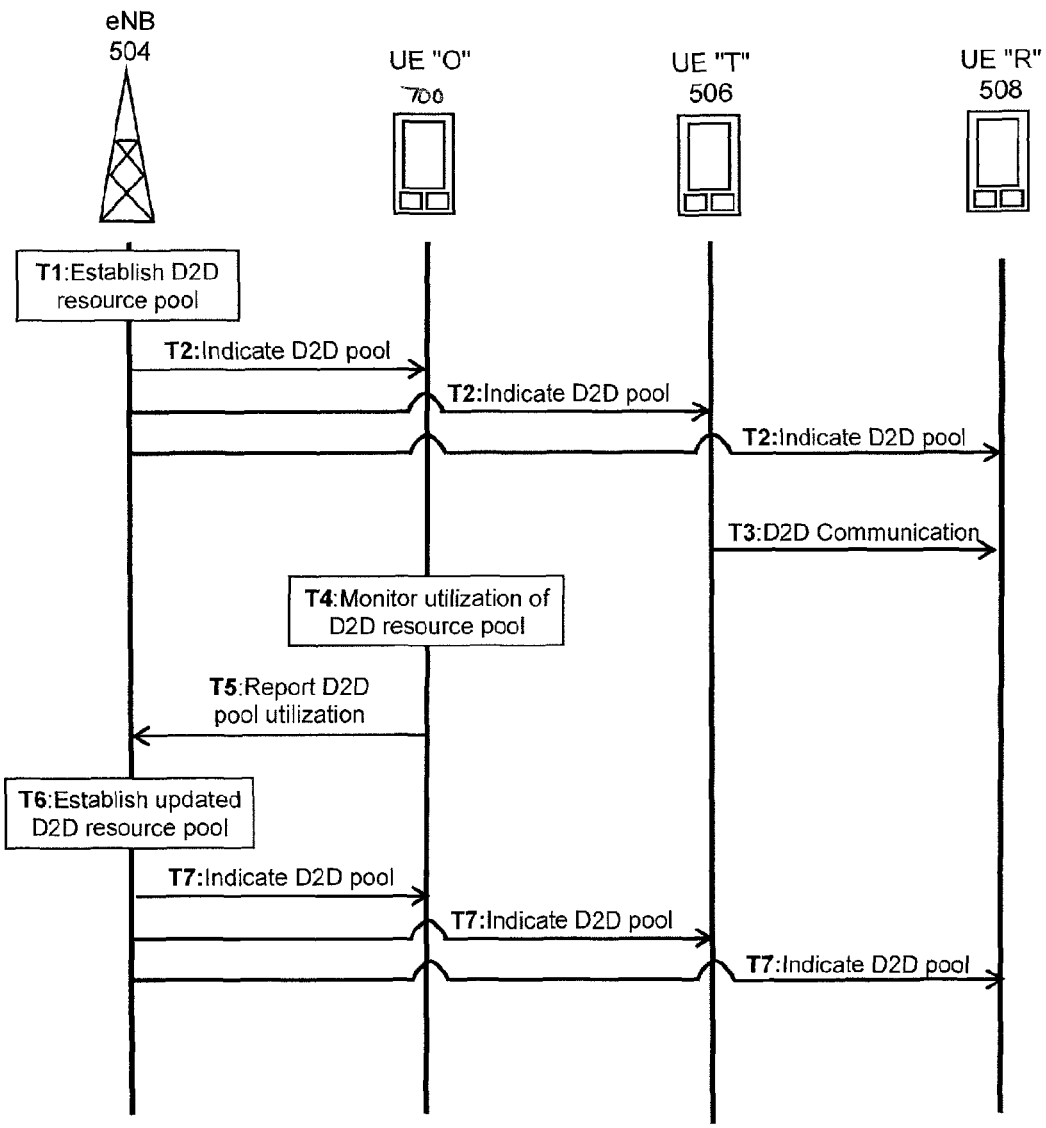

FIG. 8 is a ladder diagram schematically representing signalling exchange between the base station 504, and the terminal devices 506, 508 schematically represented in FIG. 5 in accordance with certain other embodiments of the disclosure. FIG. 8 also represents a third terminal device 700 (labelled as UE "O") and this may be referred to as the "other" terminal device 700 to distinguish it from the transmitting terminal device 506 and the receiving terminal device 508. The other terminal device 700 is represented as an separate terminal device in FIG. 8 because its functionality as described herein may in general be provided by any terminal device within the wireless telecommunications system in the vicinity of the transmitting and receiving terminal devices 506, 508. Thus, the other terminal device 700 may in fact correspond with the transmitting terminal device 506, with the receiving terminal device 508, or with another terminal device altogether. Various aspects of FIG. 8 are similar to, and will be understood from, corresponding aspects of FIGS. 6 and 7 and are not described again in detail in the interests of brevity.

In step T1 the base station 504 establishes an initial D2D resource pool. This step corresponds with step S1 in FIG. 6 and step U1 in FIG. 7.

In step T2 the base station transmits an indication of the set of resources comprising the D2D transmission resource pool established in step T1 to the terminal devices. This step corresponds with step S2 in FIG. 6 and step U2 in FIG. 7. However, as schematically represented in FIG. 8, the other terminal device 700 also receives the indication of the D2D resource pool in step T1. Again, this information may be communicated in accordance with established techniques for communicating configuration information in wireless telecommunications systems, for example through system information or other control signalling.

Thus, at the end of step T2 in FIG. 8, a D2D resource pool has been established and communicated to the terminal devices 506, 508, 700.

As with FIG. 7, it is assumed for FIG. 8 the transmitting terminal device 506 has no difficulty accessing D2D resources from the available pool for communicating with the receiving terminal device 508 in a D2D mode. Thus the transmitting terminal device proceeds to undertake D2D transmissions to the receiving terminal device in accordance with whichever D2D protocols are being implemented. This is schematically presented by step T3 in FIG. 8.

In step T4 of FIG. 8 the other terminal device 700 (which as noted above may in fact correspond with the transmitting or receiving terminal device) is configured to monitor utilisation of the D2D resource pool in its vicinity. The other terminal device 700 may do this, for example, by monitoring for transmissions being made on the reserved D2D resources, for example by monitoring for signalling signatures associated with D2D transmissions on the relevant resources, or simply measuring the power being transmitted in the cell on the relevant resources. The utilisation monitoring in step T4 thus provides an indication of the extent to which the D2D resources are being utilised.

In step T5 the other terminal device 700 transmits a report to the base station indicating the extent to which the D2D resources are being utilised according to the monitoring measurements from step T4. This report may, for example, comprise indications of the measurements made, or a simple indication of a fractional utilisation for the D2D resource pool in the vicinity of the other terminal device derived from the measurements. This signalling may be exchanged in accordance with conventional reporting techniques in wireless telecommunications systems, for example using radio resource control, RRC, signalling techniques.

The signalling exchanged in step T5 in effect corresponds to the base station receiving a feedback report from the terminal device indicating the extent to which the D2D resource pool is currently (or at least at the time of T4) being utilised.

It will be recognised the combination of steps T4 and T5 in FIG. 8 broadly correspond with step U4 in FIG. 7 in that they provide the base station with an indication of measurements of resource utilisation. However, whereas in FIG. 7 these measurements are made by the base station itself, in FIG. 8 the measurements are made by a terminal device which is remote from the base station reported back to the base station. In effect the approach of FIG. 8 allows the base station to use one or more terminal devices to remotely measure D2D utilisation on its behalf.

Once the base station has received (determined) the extent to which the radio resources made available for D2D transmissions are being utilised in step T5, processing proceed to steps T6 and T7 which are similar to, and will be understood from steps U5 and U6 represented in FIG. 7.

Thus, at the end of step T7, an updated D2D resource pool has been established and communicated to the terminal devices 506, 508, 700. On receiving the updated D2D resource pool in step T6, terminal devices may begin monitoring the updated D2D resources for potential transmissions and may begin using the updated D2D resources for D2D transmissions. Furthermore, terminal devices which are to perform monitoring of the kind represented in step T4 may proceed with monitor the updated resource pool.

Thus, as noted above, the approach of FIG. 8 is similar to the approach of FIG. 7, but the base station in effect uses remote terminal devices to establish measurements for D2D resource pool utilisation. In some examples each and every terminal device may be configured to monitor utilisation of D2D resources in its own vicinity and report back to the base station in steps corresponding to T4 and T5. In other examples only a subset of terminal devices operating in the wireless telecommunications system may be configured to perform this function. For example, the base station may configure a subset of terminal devices spread throughout the cell to perform this function to give the base station an indication of the extent to which D2D resources are being used (utilised) throughout the cell. For example, with this information the base station may in principle reserve different sets of resources for different locations in a cell according to local utilisation reports.

Thus the approach of FIG. 8 provides similar advantages to those discussed above for FIG. 7, while also reducing the risk of there being locations within a cell where the D2D resources are over-utilised but the base station is not made aware of this.

Terminal devices which are configured to provide reporting of the kind represented in step T5 may be configured to do this on request, for example on receiving signalling from the base station to trigger the execution of steps corresponding to steps T4 and T5 in FIG. 8 (for example using Measurement Control and Measurement Report techniques in an LTE context), and/or may be configured to perform the monitoring and reporting according to a predefined the measurement schedule. In another example, certain terminal devices may be configured to regularly monitor utilisation, but to only send a report if certain conditions are met, for example if the measured utilisation is departing from a desired utilisation by more than a threshold amount.

Thus, approaches of the kind described above provide mechanisms for allowing a set of radio resources allocated for D2D communications within a wireless communication system to be dynamically adjusted in response to utilisation. It will be appreciated that features of the different approaches may be combined. For example, as well as having terminal devices provide feedback on resource utilisation measurements as in FIG. 8, the base station itself may also monitor utilisation as in FIG. 7, and/or furthermore may adopt the approach adopted in FIG. 6.

In some cases the responses to measured changes in D2D resource utilisation may be relatively fast, for example a base station may be configured to update the D2D resource pool within a time frame on the order of seconds or minutes. However, in other examples the approaches of the kind described herein may be used to establish a D2D traffic profile on a more long-term basis. This may then form the basis for more long-term reconfiguration. Also, rather than acting a reactive manner, the principles described above may be used to establish a predicted pattern of D2D resource usage with changes made accordingly. For example, in an approach based on FIG. 7, the base station may monitor utilisation of a D2D resource pool for an extended period, for example a week, to determine a pattern of usage (e.g. times of day when D2D communications are particularly high or low), and may then configure updated D2D resources at different times according to this pattern. That is to say, there may in effect be a significant delay between steps U4 and U5 in the processing represented in FIG. 7.

Whilst in the above-described examples it is a base station that is responsible for establishing the pool (set) of resources to use for D2D communications within a cell, and will be appreciated that in other examples, a relay node may perform this task. In other implementations a different network entity may be responsible for performing this task, for example on the basis of feedback reporting of the kind described above which is passed back to the network entity from a base station. In this regard the set of resources reserved for D2D communications may be determined on a cell-by cell basis, or more widely in the network. For example, a network entity may determine there should be a change in the resources reserved for D2D communications within a particular cell because of reported congestion or under-utilisation in that cell, and may instruct a base station serving that cell to respond accordingly. The network entity may also instruct other base stations to adjust the resources they have reserved for D2D operations within their respective cells. This may be done, for example, to ensure there is a degree of uniformity in the resources reserved for D2D communications in different cells within the network, for example among neighbouring cells.

Whilst in the above-described embodiments it is assumed the terminal devices undertaking D2D communications are also able to communicate with other terminal devices via a base station in a conventional non-D2D manner, it will be appreciated that in principle a terminal device according to an embodiment of the disclosure could be a dedicated D2D device that did undertake communications with other terminal devices through a base station.

Although the above-described examples have focused on implementations in the context of an LTE-based wireless telecommunications system, it will be appreciated similar principles can be adopted for in wireless telecommunications systems operating in accordance with other protocols.

Thus there has been described schemes for supporting device-to-device, D2D, communications between terminal devices in a wireless telecommunication system. A network entity, e.g. a base station, establishes a set (pool) of radio resources to be reserved for use for D2D communications and communicates an indication of these resources to terminal devices. The terminal devices may then proceed to undertake D2D communications using the reserved set of radio resources. On an ongoing basis the network entity monitors the extent to which the set of radio resources reserved for D2D communications is being used, for example based on feedback received from terminal devices or its own measurements. If it is determined the set of radio resources reserved for D2D communications is being under-utilized or over-utilized, the network entity may establish an updated set of radio resources to be used for D2D communications, and communicate this to the terminal devices. For example, if the reserved resources are being under-utilized by at least a predefined amount, the amount of resources set aside for D2D communications may be reduced. Conversely, if the reserved resources are being over-utilized, e.g. more than a predefined fractional utilization, the set of resources may be increased. Thus a mechanism is provided for dynamically adjusting the size of a set of resources available for D2D communications in response to changing resource utilization. This can help with optimizing overall resource usage within the wireless telecommunication system with reduced risk of D2D congestion.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a network entity in a wireless telecommunication system supporting device-to-device, D2D, communications between terminal devices, the method comprising:
    establishing a set of radio resources to be made available for D2D communications within the wireless telecommunication system;
    communicating an indication of the set of radio resources to terminal devices operating in the wireless telecommunications system;
    determining an indication of an extent to which the set of radio resources is being used for D2D communications;
    establishing an updated set of radio resources to be made available for D2D communications within the wireless telecommunication system based on the indication of the extent to which the set of radio resources is being used for D2D communications; and
    communicating an indication of the updated set of radio resources to terminal devices operating within the wireless telecommunications system.

Paragraph 2. The method of paragraph 1, wherein the indication of the extent to which the set of radio resources is being used for D2D communications is determined from feedback received from one or more terminal devices regarding the extent to which the set of radio resources is being used for D2D communications.

Paragraph 3. The method of paragraph 2, wherein the feedback comprises radio resource control, RRC, signalling.

Paragraph 4. The method of paragraph 2 or 3, wherein the feedback received from a terminal device comprises an indication the terminal device has been restricted in an attempt to make use of radio resources within the set of radio resources for D2D communication.

Paragraph 5. The method of paragraph 2, 3 or 4, wherein the feedback received from a terminal device comprises an indication of measurements made by the terminal device of the extent to which the set of radio resources is being used for D2D communications.

Paragraph 6. The method of paragraph 5, wherein the feedback is received in response to the network entity transmitting a request for the terminal device to provide the feedback.

Paragraph 7. The method of paragraph 5 or 6, wherein the feedback is received in accordance with a predefined measurement schedule.

Paragraph 8. The method of paragraph 5, 6 or 7, wherein the feedback is received in response to the terminal device determining the extent to which the set of radio resources is being used for D2D communications exceeds a predefined threshold.

Paragraph 9. The method of any of paragraphs 1 to 8, wherein the indication of the extent to which the set of radio resources is being used for D2D communications is determined from the network entity measuring the extent to which the set of radio resources is being used for D2D communications.

Paragraph 10. The method of any of paragraphs 1 to 9, wherein the step of establishing an updated set of radio resources comprises increasing the amount of radio resources to be made for D2D communications if the indication of the extent to which the set of radio resources is being used for D2D communications indicates more than an upper threshold amount of the set of radio resources is being used and/or wherein the step of establishing an updated set of radio resources comprises decreasing the amount of radio resources to be made available for D2D communications if the indication of the extent to which the set of radio resources is being used for D2D communications indicates less than a lower threshold amount of the set of radio resources is being used.

Paragraph 11. The method of any of paragraphs 1 to 10, further comprising:
  determining an indication of an extent to which the updated set of radio resources is being used for D2D communications;
  establishing a further updated set of radio resources to be made available for D2D communications within the wireless telecommunication system based on the indication of the extent to which the updated set of radio resources is being used for D2D communications; and
  communicating an indication of the further updated set of radio resources to terminal devices operating within the wireless telecommunications system.

Paragraph 12. The method of any of paragraphs 1 to 11, further comprising the network entity transmitting one or more radio resource allocation messages to one or more terminal devices to indicate radio resources from within the set of radio resources to be used by the one or more terminal devices for D2D transmissions.

Paragraph 13. The method of any of paragraphs 1 to 12, wherein the network entity is a base station.

Paragraph 14. A network entity for use in a wireless telecommunication system supporting device-to-device, D2D, communications between terminal devices, wherein the network entity comprises a controller unit and a transceiver unit configured to operate together to:
  establish a set of radio resources to be made available for D2D communications within the wireless telecommunication system;
  communicate an indication of the set of radio resources to terminal devices operating in the wireless telecommunications system;
  determine an indication of an extent to which the set of radio resources is being used for D2D communications;
  establish an updated set of radio resources to be made available for D2D communications within the wireless telecommunication system based on the indication of the extent to which the set of radio resources is being used for D2D communications; and
  communicate an indication of the updated set of radio resources to terminal devices operating within the wireless telecommunications system.

Paragraph 15. Circuitry for a network entity for use in a wireless telecommunication system supporting device-to-device, D2D, communications between terminal devices, wherein the circuitry comprises a controller element and a transceiver element configured to operate together to cause the network entity to:
  establish a set of radio resources to be made available for D2D communications within the wireless telecommunication system;
  communicate an indication of the set of radio resources to terminal devices operating in the wireless telecommunications system;
  determine an indication of an extent to which the set of radio resources is being used for D2D communications;
  establish an updated set of radio resources to be made available for D2D communications within the wireless telecommunication system based on the indication of the extent to which the set of radio resources is being used for D2D communications; and
  communicate an indication of the updated set of radio resources to terminal devices operating within the wireless telecommunications system.

Paragraph 16. A method of operating a terminal device in a wireless telecommunication system supporting device-to-device, D2D, communications between terminal devices, the method comprising:
  receiving an indication of a set of radio resources available for D2D communications within the wireless telecommunication system from a network entity;
  determining an indication of an extent to which the set of radio resources is being used for D2D communications; and
  transmitting the indication of the extent to which the set of radio resources is being used for D2D communications to the network entity.

Paragraph 17. The method of paragraph 16, wherein the indication of the extent to which the set of radio resources is being used for D2D communications comprises radio resource control, RRC, signalling.

Paragraph 18. The method of paragraph 16 or 17, wherein the step of determining an indication of an extent to which the set of radio resources is being used for D2D communications comprises the terminal device determining it has been restricted in an attempt to use radio resources within the set of radio resources for D2D communication.

Paragraph 19. The method of any of paragraphs 16 to 18, wherein the terminal device determining it has been restricted in an attempt to use radio resources comprises the terminal device determining it has been prevented from using the set of radio resources to make a D2D transmission.

Paragraph 20. The method of any of paragraphs 16 to 19, wherein the terminal device determining it has been restricted in an attempt to use radio resources comprises the terminal device determining it was required to wait for more than a predefined delay before being able to use the set of radio resources to make a D2D transmission.

Paragraph 21. The method of any of paragraphs 16 to 20, wherein the terminal device determining it has been restricted in an attempt to use radio resources comprises the terminal device determining there was less than a predefined amount of the set of radio resources remaining available for use by the terminal device to make a D2D transmission.

Paragraph 22. The method of any of paragraphs 16 to 21, further comprising the terminal device measuring the extent to which the set of radio resources is being used for D2D communications and determining the indication of the extent to which the set of radio resources is being used for D2D communications therefrom.

Paragraph 23. The method of paragraph 22, wherein the terminal device measures the extent to which the set of radio resources is being used for D2D communications in response to receiving from the network entity a request to transmit the indication of the extent to which the set of radio resources is being used for D2D communications.

Paragraph 24. The method of paragraph 22 or 23, wherein the terminal device measures the extent to which the set of radio resources is being used for D2D communications in accordance with a predefined measurement schedule.

Paragraph 25. The method of paragraph 22, 23 or 24, wherein the terminal device transmits the indication of the extent to which the set of radio resources is being used for D2D communications to the network entity in response to the terminal device determining from the measurements the extent to which the set of radio resources is being used for D2D communications exceeds a predefined threshold.

Paragraph 26. The method of any of paragraphs 16 to 25, further comprising receiving an indication of an updated set of radio resources available for D2D communications within the wireless telecommunication system from the network entity;
 determining an indication of an extent to which the updated set of radio resources is being used for D2D communications; and
 transmitting the indication of the extent to which the updated set of radio resources is being used for D2D communications to the network entity.

Paragraph 27. The method of any of paragraphs 16 to 26, further comprising receiving from the network entity one or more radio resource allocation messages to indicate radio resources selected from within the set of radio resources to be used by the terminal device for one or more D2D transmissions.

Paragraph 28. The method of any of paragraphs 16 to 27, further comprising the terminal device selecting radio resources from within the set of radio resources to use for one or more D2D transmissions.

Paragraph 29. The method of paragraph 28, further comprising making the one or more D2D transmissions using the radio resources selected from within the set of radio resources.

Paragraph 30. A terminal device for use in a wireless telecommunication system supporting device-to-device, D2D, communications between terminal devices, wherein the terminal device comprises a controller unit and a transceiver unit configured to operate together to:
 receive an indication of a set of radio resources available for D2D communications within the wireless telecommunication system from a network entity;
 determine an indication of an extent to which the set of radio resources is being used for D2D communications; and
 transmit the indication of the extent to which the set of radio resources is being used for D2D communications to the network entity.

Paragraph 31. Circuitry for a terminal device for use in a wireless telecommunication system supporting device-to-device, D2D, communications between terminal devices, wherein the circuitry comprises a controller element and a transceiver element configured to operate together to cause the terminal device to:
 receive an indication of a set of radio resources available for D2D communications within the wireless telecommunication system from a network entity;
 determine an indication of an extent to which the set of radio resources is being used for D2D communications; and
 transmit the indication of the extent to which the set of radio resources is being used for D2D communications to the network entity.

Paragraph 32. A method of operating a terminal device in a wireless telecommunication system supporting device-to-device, D2D, communications between terminal devices, the method comprising:
 receiving an indication of a set of radio resources available for D2D communications within the wireless telecommunication system from a network entity;
 monitoring the set of radio resources to determine if another terminal device is seeking to communicate with the terminal device in a D2D manner using the set of radio resources;
 receiving an indication of an updated set of radio resources available for D2D communications within the wireless telecommunication system from the network entity; and
 monitoring the updated set of radio resources to determine if another terminal device is seeking to communicate with the terminal device in a D2D manner using the set of radio resources.

Paragraph 33. A terminal device for use in a wireless telecommunication system supporting device-to-device, D2D, communications between terminal devices, wherein the terminal device comprises a controller unit and a transceiver unit configured to operate together to:
 receive an indication of a set of radio resources available for D2D communications within the wireless telecommunication system from a network entity;
 monitor the set of radio resources to determine if another terminal device is seeking to communicate with the terminal device in a D2D manner using the set of radio resources;
 receive an indication of an updated set of radio resources available for D2D communications within the wireless telecommunication system from the network entity; and
 monitor the updated set of radio resources to determine if another terminal device is seeking to communicate with the terminal device in a D2D manner using the set of radio resources.

Paragraph 34. Circuitry for a terminal device for use in a wireless telecommunication system supporting device-to-device, D2D, communications between terminal devices, wherein the circuitry comprises a controller element and a transceiver element configured to operate together to cause the terminal device to:
 receive an indication of a set of radio resources available for D2D communications within the wireless telecommunication system from a network entity;
 monitor the set of radio resources to determine if another terminal device is seeking to communicate with the terminal device in a D2D manner using the set of radio resources;
 receive an indication of an updated set of radio resources available for D2D communications within the wireless telecommunication system from the network entity; and
 monitor the updated set of radio resources to determine if another terminal device is seeking to communicate with the terminal device in a D2D manner using the set of radio resources.

REFERENCES

[1] LTE for UMTS: OFDMA and SC-FDMA Based Radio Access, Harris Holma and Antti Toskala, Wiley 2009, ISBN 978-0-470-99401-6.
[2] R2-133840, "CSMA/CA based resource selection," Samsung, published at 3GPP TSG-RAN WG2 #84, San Francisco, USA, 11-15 Nov. 2013.
[3] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.
[4] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.
[5] R2-134426, "Medium Access for D2D communication", LG Electronics Inc, published at 3GPP TSG-RAN WG2 #84, San Francisco, USA, 11-15 Nov. 2013.
[6] R2-134238,".
[8] R2-134431, "Simulation results for D2D voice services using connectionless approach", General Dynamics Broadband UK, published at 3GPP TSG-RAN WG2 #84, San Francisco, USA, 11-15 Nov. 2013.
[9] "D2D Resource Allocation under the Control of BS", Xiaogang R. et al, University of Electronic Science and Technology of China, https//mentor.ieee.org/802.16/dcn/13/16-13-0123-02-000n-d2d-resource-allocation-under-the-control-of-bs.docx
[10] US 2013/0170387
[11] US 2012/0300662

The invention claimed is:

1. A terminal device for use in a wireless telecommunication system supporting device-to-device (D2D) communications between terminal devices, wherein the terminal device comprises:
   circuitry configured to
      receive an indication of a set of radio resources available for D2D communications within the wireless telecommunication system from a network entity;
      monitor the set of radio resources to determine if another terminal device is seeking to communicate with the terminal device in a D2D manner using the set of radio resources;
      receive an indication of an updated set of radio resources available for D2D communications within the wireless telecommunication system from the network entity; and
      monitor the updated set of radio resources to determine if another terminal device is seeking to communicate with the terminal device in a D2D manner using the set of radio resources.

2. Circuitry for a terminal device for use in a wireless telecommunication system supporting device-to-device (D2D) communications between terminal devices, wherein the circuitry is configured to:
   receive an indication of a set of radio resources available for D2D communications within the wireless telecommunication system from a network entity;
   monitor the set of radio resources to determine if another terminal device is seeking to communicate with the terminal device in a D2D manner using the set of radio resources;
   receive an indication of an updated set of radio resources available for D2D communications within the wireless telecommunication system from the network entity; and
   monitor the updated set of radio resources to determine if another terminal device is seeking to communicate with the terminal device in a D2D manner using the set of radio resources.

* * * * *